Figures 1, 2:
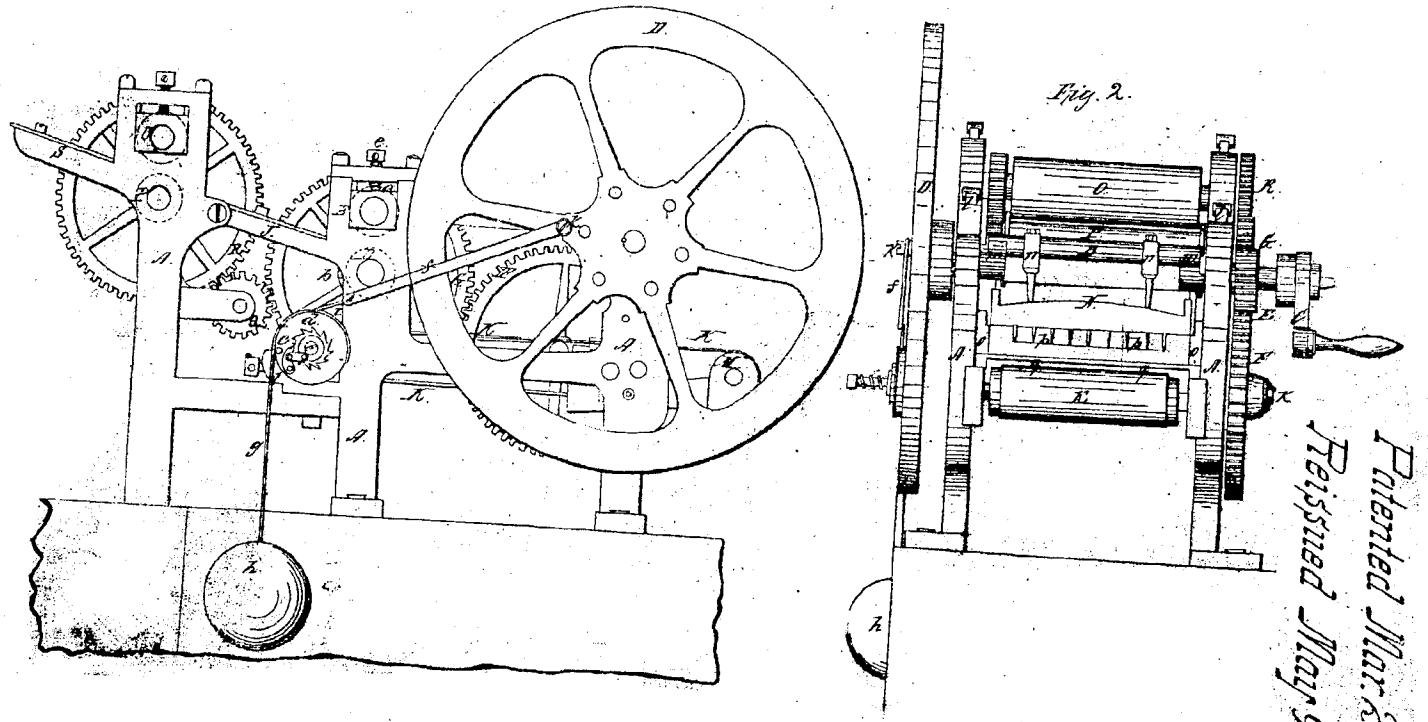

Sheet 1-2 Sheets.

W. R. Nevins,

Cracker Machine,

Patented Mar. 2, 1836

Reissued May 9, 1843

№ 112,

W. R. Nerins,
Sheet 2-2 Sheets.
Cracker Machine,
Patented Mar. 2, 1836.
Reissued May 9, 1848.
№ 112,
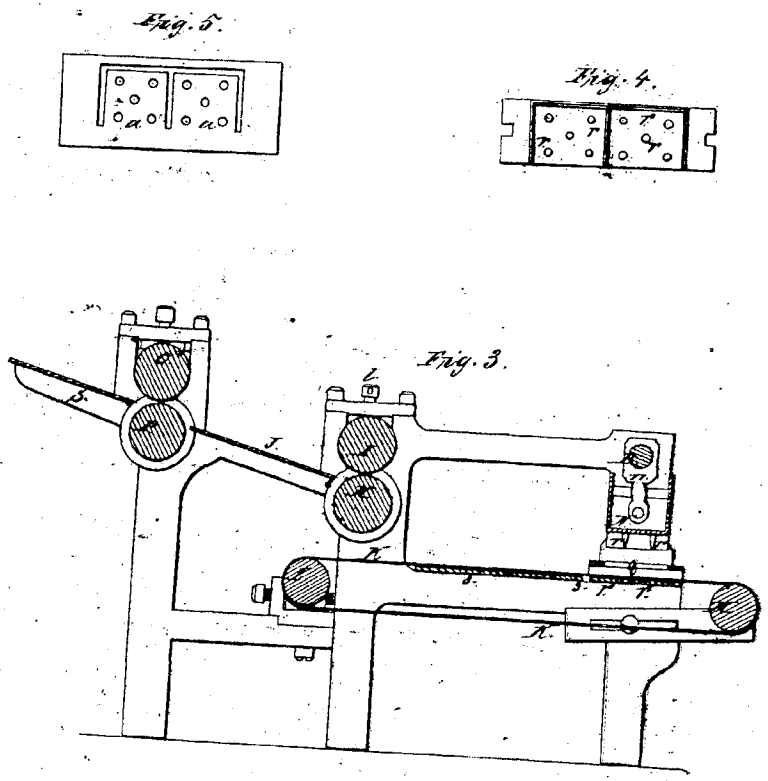

UNITED STATES PATENT OFFICE.

WILLIAM R. NEVINS, OF NEW YORK, N. Y.

IMPROVEMENT IN MACHINES FOR ROLLING DOUGH AND CUTTING CRACKERS AND BISCUIT.

Specification forming part of Letters Patent No. 141, dated March 2, 1836; Reissue No. 112, dated May 9, 1848.

*To all whom it may concern:*

Be it known that I, WILLIAM R. NEVINS, of the city, county, and State of New York, have invented certain new and useful Improvements in the Machine for Rolling Dough and Cutting the same into Crackers or Biscuits; and I do hereby declare that the following is a full, clear, and exact description of the principle or character which distinguishes them from all other things before known, and of the manner of making, constructing, and using the same, reference being had to the accompanying drawings, making part of this specification, in which—

Figure 1 is a side elevation of the machine, and Fig. 2 an elevation of the delivery end thereof, and Fig. 3, a longitudinal vertical section.

The same letters indicate like parts in all the figures.

The nature of my invention consists in cutting the crackers by means of reciprocating cutters which have an up-and-down motion, in combination with an endless apron which carries the dough to the cutters on which the crackers or biscuits are cut, and which removes them from under the cutters after being cut, when this combination is produced and effected by connecting the reciprocating motion of the cutters with the said apron by mechanical means to give to it an intermittent motion that will keep the apron at rest while the cutters are cutting into and rising from the dough and then move it forward the required distance to present the sheet of dough for the cutting of another set of crackers or biscuits.

A A is the frame of the machine, which may be made of either wood or iron.

B is a shaft to which the driving-power may be applied. This is represented as having a winch, C, on one of its ends, which may be used when it is to be driven by hand; but it may be actuated by any other motive power.

D is a fly-wheel on the opposite end of said shaft.

The shaft B is represented as a crank-shaft carrying the cutters and dockers to be presently described.

On the shaft B there is a pinion, E, from which motion is communicated to the other parts of the apparatus. The pinion E gears into a spur-wheel, F, which revolves on an independent center or axis, *k*, said wheel F being intermediate between the pinion E and the spur-wheel G, which is on the shaft of the lower roller, H, of the pair of rollers by which the dough is rolled out, the roller I being the upper roller of this pair. These are geared together by pinions on one of their ends, (seen in part at *a* and *b*, Fig. 1.) These pinions mesh sufficiently deep into one another to allow of the adjusting of the rollers to the varying thickness which it may be desired to give to the dough, which is done by means of the adjusting screws l l. They may be about five or six inches in diameter and about sixteen inches long, more or less.

The dough having been properly prepared, is to be placed on an inclined feeding-board, J, down which it will tend to descend by its own gravity, and the lower portion of it being flattened and passed by hand between the rollers H I, it will be rolled out by the revolving of said rollers to a unform thickness, and will pass from them onto an endless apron, K, that passes round the feeding-rollers L M. These feeding-rollers are to remain at rest during the operation of the cutters, and for this purpose have an intermitting motion given to them by means of an apparatus shown on the side elevation, Fig. 1, where *c* is a ratchet-wheel and *d* is a small pulley or drum on the end of the feeding-roller L.

*e* is a crank-pin on the fly-wheel D, that carries a rod, *f*, to which is attached a cord or band, *i*, that passes around the pulley *d*, and like the cord *i* is attached thereto, the weight *h* being suspended from its outer end. By means of this apparatus and of the pawl *j*, jointed to the wheel *d*, which engages with the ratchet-wheel *c* in one direction, but does not act up on it in the reverse direction (a device well understood by machinists) an intermitting motion will be communicated to the feeding-roller L and consequently to the endless apron K K.

The amount of the motion given to the feeding-apron is such as to feed the rolled dough to such an extent equal to the width of the biscuits or crackers to be cut, and the rollers H I must be so geared as to supply this quantity. This may be regulated by changing the pinion E, the center or axis *k* of the intermediate wheel, F, being made movable in a slot to admit of such change. As the dough passes from between the rollers H I it has to descend to the apron K, a distance equal to the diameter of the lower roller, as seen distinctly in Fig. 3, and this allows sufficient play to the endless apron for its intermitting motion.

The cutting of the dough is effected in the following manner: The shaft B, I have said, operates as a crank-shaft. Its wrists are shown at *m m*, Fig. 2. *n n* are the lifters that embrace the crank-shaft, and are attached to the cutting-slide N, that has grooves in its ends that are adapted to the guide-tongues *o o*. The cutters and dockers are attached to the bottom of the slide N, as shown at *p* and in a face view in Fig. 4. The cutters are here represented as adapted to square crackers or biscuits; but they may be equally well adapted to the cutting of them round or in any other form. The plate *q q* is the clearer, and is shown separately in Fig. 5. It is perforated in such manner as to allow the cutters and dockers to pass through it and operate on the dough. Directly under the cutters, and below the upper section of the endless apron, there is an iron plate, (shown at *r r* in Fig. 3,) which plate sustains the action of the cutters. There should also be a supporting board or table, *s*, under the apron, to prevent its swagging with the weight of the dough. The distance between the rollers H I and the cutters may be about five feet, as this leaves sufficient room for the proper action of the respective parts.

I have represented what I deem the most convenient mode of moving the cutters up and down by using the shaft B as a crank-shaft; but this may be effected by a rack and pinion, in the manner of the well-known mangle-wheel motion, or by a segment-wheel motion, or by arms or tappets, and I do not, therefore, intend to limit myself to the particular device herein shown, but to adopt any equivalent means of attaining the same end.

It will be obvious from the foregoing that the arrangement of parts for communicating the intermitting motion to the apron from the shaft that gives the reciprocating motions to the cutters may be varied, and yet attain the same end—as, for instance, instead of the cords and weights that operate the wheel *d*, that carries the pawl *j*, a rack on the end of the connecting-rod may be substituted to operate a cog-wheel instead of the wheel *d*; and, in fact, any equivalent mechanical movement may be substituted.

I have found it advantageous to prepare the dough for being finally rolled out by the rollers H I by passing it through preparing-rollers, which I have used separate from my machine when the latter is made to operate by hand. When it is moved by other power such preparing-rollers may be attached to the machine and be actuated by the same power, and I have so represented it in the accompaing drawings, but without intending to make any claim to the so attaching it.

O and P are the auxiliary or preparing rollers, which may be driven by an intermediate pinion, Q, gearing into a wheel, R, on the lowermost of these rollers, S, being an inclined board upon which to place the dough.

What I claim as my invention, and desire to secure by Letters Patent, is—

1. Cutting by means of reciprocating cutters on an apron having an intermittent motion, substantially as described, by combining and connecting together, in the manner substantially as herein described, the reciprocating motion of the cutters with the intermitting progressive motion of the apron that carries the dough to and under the cutters, to be delivered, as described, whereby the apron moves the dough forward the required distance while the cutters are up, and remains at rest while they are cutting and leaving the dough.

2. The stationary plate or clearer with perforations through which the cutters and dockers pass when this is combined with the reciprocating cutters and dockers, and the apron that passes below it with an intermitting motion, as described.

WILLIAM R. NEVINS.

Witnesses:
R. W. LOWBER,
A. P. BROWNE.